United States Patent
Parrish

(10) Patent No.: US 7,709,793 B2
(45) Date of Patent: May 4, 2010

(54) BOLOMETER ARRAY COMPENSATION

(76) Inventor: William J. Parrish, 4185 La Ladera Rd., Santa Barbara, CA (US) 93110

( * ) Notice: Subject to any disclaimer, the term of this patent is extended or adjusted under 35 U.S.C. 154(b) by 0 days.

(21) Appl. No.: 11/777,019

(22) Filed: Jul. 12, 2007

(65) Prior Publication Data

US 2009/0014653 A1    Jan. 15, 2009

(51) Int. Cl.
*G01J 5/00* (2006.01)
(52) U.S. Cl. .................................................. 250/338.1
(58) Field of Classification Search .............. 250/338.1, 250/338.2, 338.3, 338.4, 338.5
See application file for complete search history.

(56) References Cited

U.S. PATENT DOCUMENTS

| | | | |
|---|---|---|---|
| 5,756,999 A * | 5/1998 | Parrish et al. ............... | 250/332 |
| 6,028,309 A | 2/2000 | Parrish et al. | |
| 6,433,333 B1 | 8/2002 | Howard | |
| 6,812,465 B2 | 11/2004 | Parrish et al. | |
| 6,891,161 B2 | 5/2005 | Ionescu et al. | |
| 2002/0022938 A1 * | 2/2002 | Butler ........................... | 702/85 |
| 2002/0166968 A1 * | 11/2002 | Bradley .................... | 250/338.1 |
| 2003/0213910 A1 * | 11/2003 | Anderson et al. ........ | 250/338.1 |

FOREIGN PATENT DOCUMENTS

WO    WO 2007015235 A1 *    2/2007

OTHER PUBLICATIONS

Ramakrishna et al., Highly Sensitive Infrared Temperature Sensor Using Self-Heating Compensated Microbolometers, Sensors and Actuators 79 (2000), pp. 122-127.
Jansson et al., Theoretical Analysis of Pulse Bias Heating of Resistance Bolometer Infrared Detectors and Effectiveness of Bias Compensation, SPIE, vol. 2552, pp. 644-652.

* cited by examiner

*Primary Examiner*—David P Porta
*Assistant Examiner*—Kiho Kim
(74) *Attorney, Agent, or Firm*—Foley & Lardner LLP

(57) ABSTRACT

A bolometer circuit has a substrate, bolometer detectors coupled to the substrate, a source of calibration data and a compensation circuit. Each bolometer detector has an associated calibration data. The compensation circuit is configured to generate a time varying compensation signal for each bolometer detector based on its associated calibration data.

16 Claims, 8 Drawing Sheets

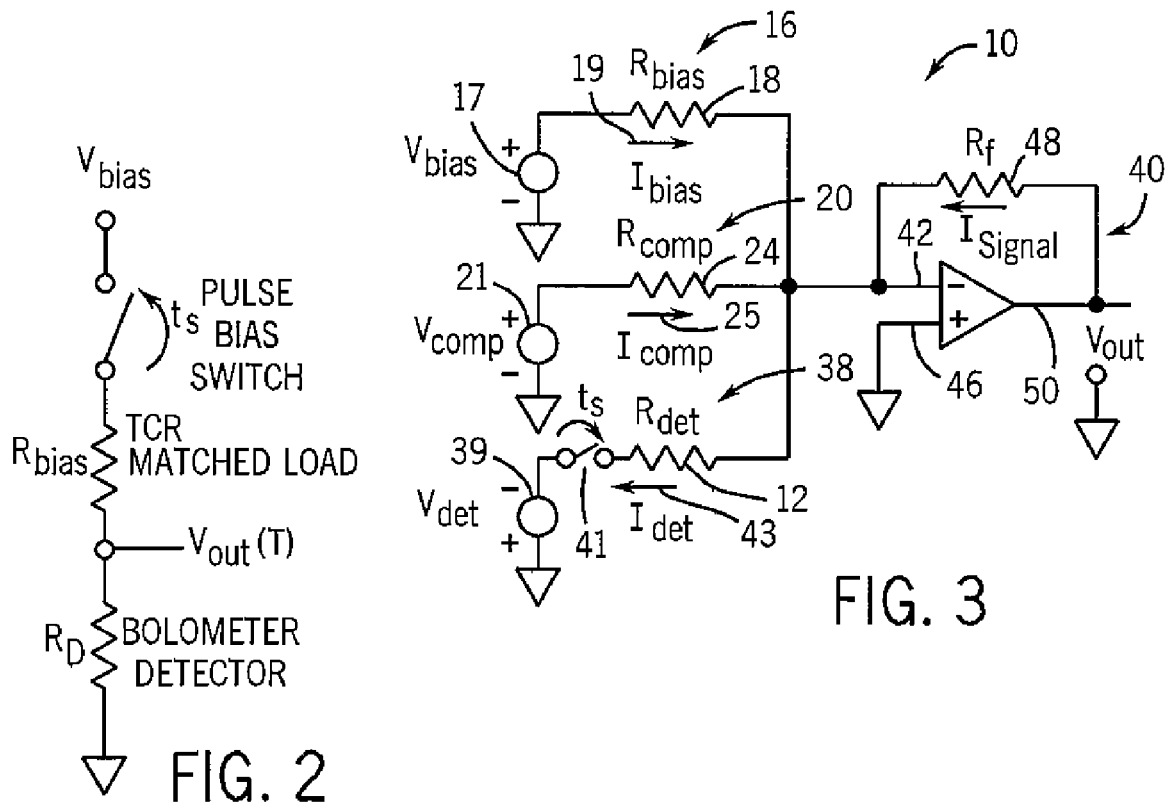
FIG. 2
FIG. 3
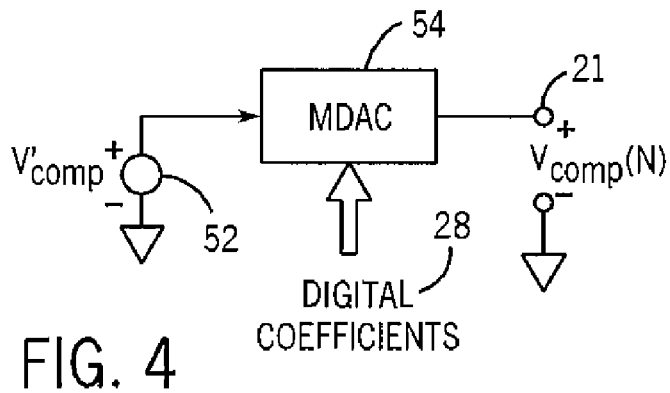
FIG. 4
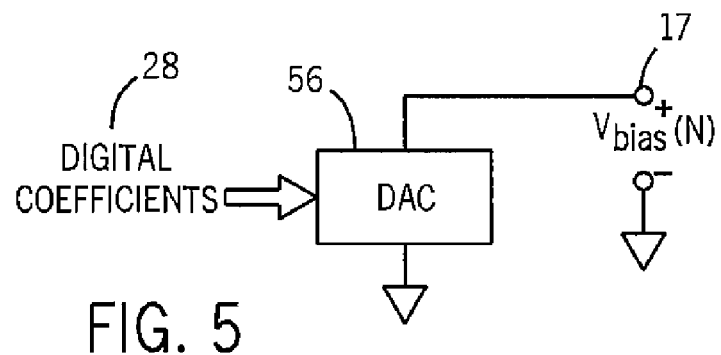
FIG. 5

FIG. 9
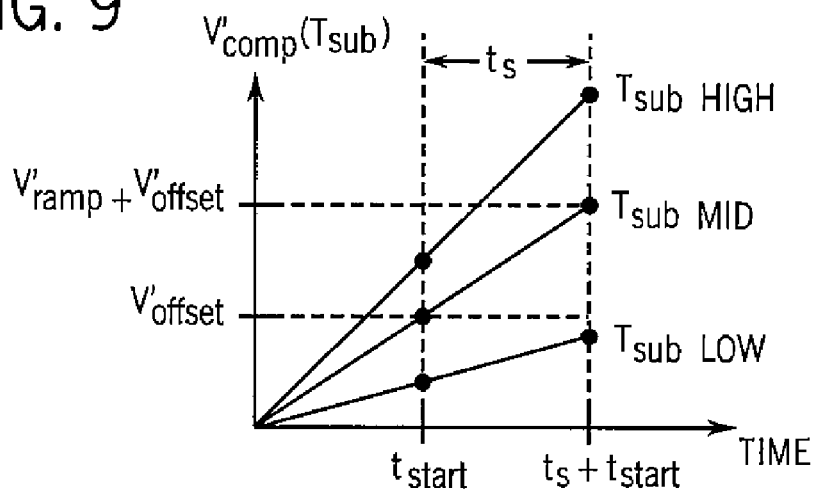
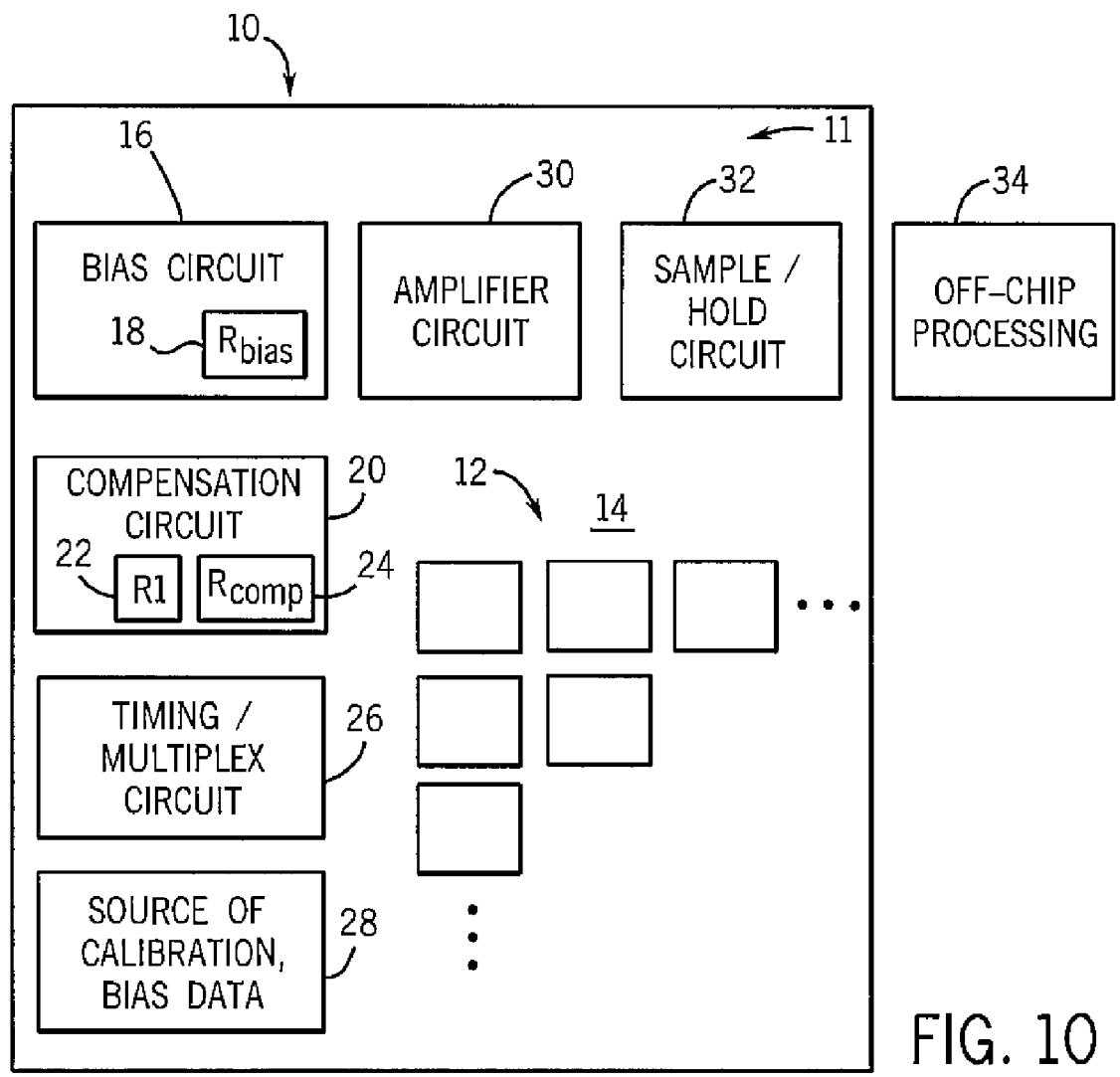
FIG. 10

BOLOMETER ARRAY COMPENSATION

BACKGROUND

A bolometer is a device for measuring incident electromagnetic radiation. While bolometers can be used to measure radiation of any wavelength, they are often used to detect infrared and radio wavelengths, and more particularly submillimeter wavelengths (from around 200 μm to 1 mm wavelength). Bolometers are often used for astronomy at these wavelengths, but have applications in consumer electronics, such as cameras, and other products, such as automobiles.

In order to measure changes in resistance of a bolometer due to optical heating, an electrical current must be passed through the bolometer. In an array format, this is often done by sequentially pulse biasing bolometers or groups of bolometers. This causes heating generally significantly larger than the optical response. This heating causes two negative effects when attempting to operate the bolometer over a wide range of ambient temperature.

First, the resistance of the bolometer is changing significantly during the readout or pulse bias period. This makes low noise measurement significantly more difficult as the temperature and therefore the response of the bolometer is changing rapidly with time. Typical solutions have been to integrate an amplified detector response signal over the pulse bias period. Since the input signal to an integrator for a biased bolometer is a ramp, the integration results in a parabolic response as shown in FIG. 1. When pulse bias heating is significant as in the case of a longer pulse bias period or higher detector bias which is done to achieve more sensitivity, the integrated pulse bias response can cause a reduction in dynamic range due to the integrated potential changing significantly over the period, thereby using up allowable circuit potential swing or dynamic range. Compensation for the ramping reduction in resistance due to heating over the bias period is used to maintain a constant output over the pulse bias period such that dynamic range is not consumed by the changing detector resistance. This is particularly true as temperature is increased, reducing detector resistance and resulting in increased power dissipation and thereby increased ramping.

Second, the pulse bias heating causes a mismatch in average response when compared to a temperature coefficient of resistance (TCR)-matched reference resistor which is thermally connected to the substrate. A reference resistor is normally used to provide a temperature compensation matching bias to the active bolometer and thereby cancel much of the substrate temperature change effects. The circuit in FIG. 2 shows a series connection of an active thermally isolated bolometer with a substrate thermally connected resistor with the same TCR. Ideally the output voltage, Vout, would remain constant over temperature. However, due to the bias heating effects, the active bolometer resistance decreases faster (with increasing substrate temperature) than the reference resistor, since the bias heating increases due to the higher power dissipation with increased current, and therefore Vout decreases with increasing temperature. Additional compensation beyond using a simple matched reference resistor is required in order that Vout remains relatively constant over temperature such that an amplified detector signal remains well within the dynamic range of the readout circuitry if the bolometer is to be operated over a wide ambient temperature range.

Proposed methods for compensation of the output ramp voltage from a detector due to temperature rise during the pulse bias period are presented in Jansson, et al., "Theoretical analysis of pulse bias heating of resistance bolometer infrared detectors and effectiveness of bias compensation," SPIE Vol. 2552, p. 644-652 (1995).

What is needed is an improved system and method for compensating for bias heating effects in a bolometer circuit when used in an array format. Further what is needed is a method of improving a bolometer array's output stability as a function of changing substrate temperature. Further what is needed is a system and method for reducing the change of the detector signals due to pulse bias heating from the bolometer circuit to allow the use of amplifiers and other components having a limited signal swing. Further what is needed is a system and method for improving the accuracy of the readout of bolometer detectors which are pulse biased, causing rapid shifts in detector temperature. Further still, what is needed is an improvement in stability which may enable a bolometer focal plane array to operate over a very wide range of substrate temperature, such as the typical commercial temperature range of −40 degrees C. to 85 degrees C., with little change in output signal compared to the dynamic range. Further still, what is needed is a bolometer focal plane which may operate without the need for a Thermo-Electric Cooler to stabilize temperature. Further still, what is needed is a bolometer focal plane which may operate without the need for controlling substrate temperature.

The teachings herein extend to those embodiments which fall within the scope of the appended claims, regardless of whether they accomplish one or more of the above-mentioned needs.

BRIEF DESCRIPTION OF THE DRAWINGS

FIG. 2 is a schematic diagram of a series connection of an active thermally isolated bolometer with a substrate thermally connected resistor with the same TCR;

FIG. 3 is a schematic diagram of a bolometer circuit, according to an exemplary embodiment;

FIG. 4 is a schematic diagram of a compensation circuit, according to an exemplary embodiment;

FIG. 5 is a schematic diagram of a bias circuit, according to an exemplary embodiment;

FIG. 9 is a chart illustrating a time varying compensation signal, according to an exemplary embodiment;

FIG. 10 is a block diagram of a bolometer circuit, according to an exemplary embodiment;

DETAILED DESCRIPTION OF THE EXEMPLARY EMBODIMENTS

Figure 1:
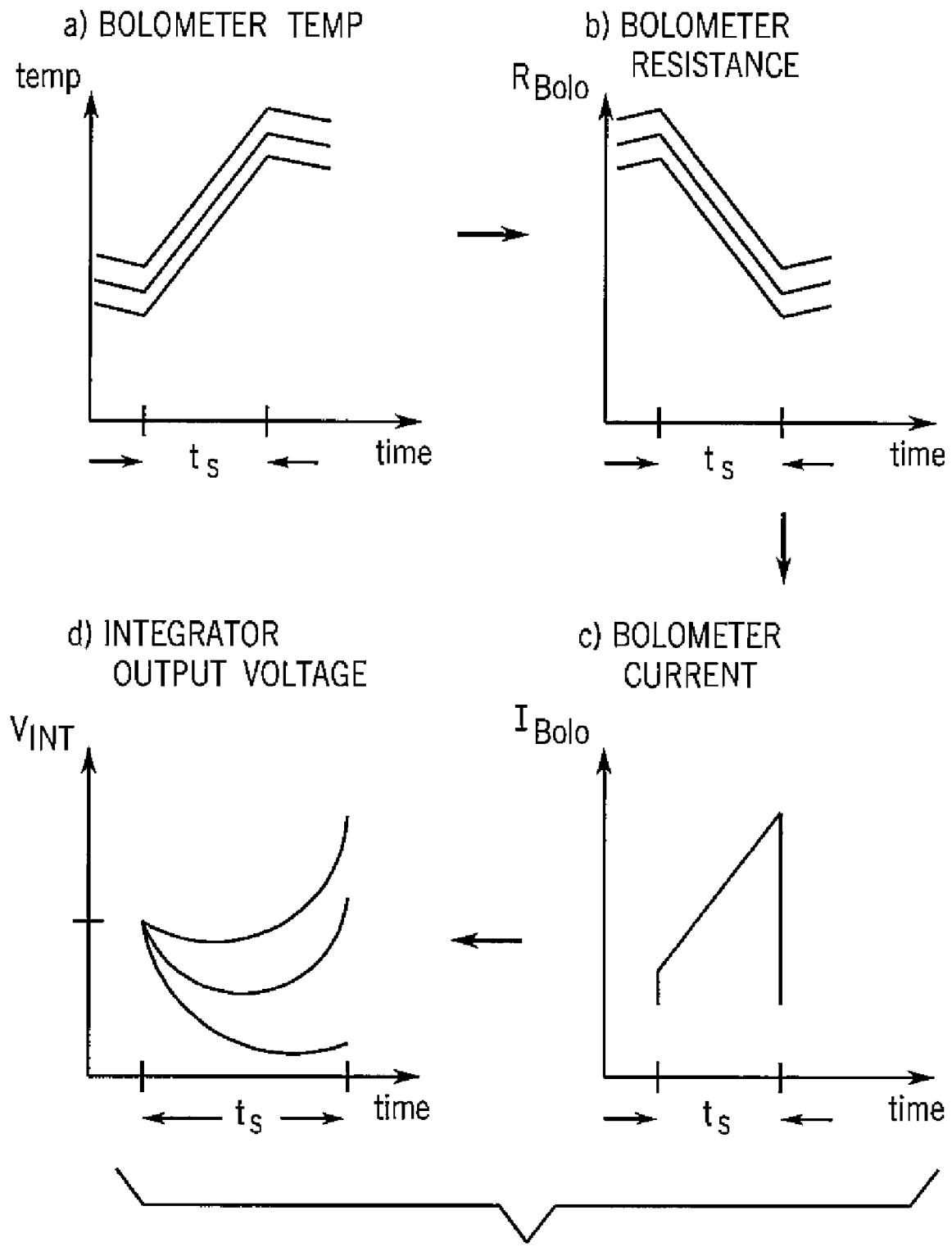
FIG. 1 is a set of charts illustrating bolometer temperature, resistance, and current and integrator output voltage.

The present specification describes various features, functions and structures for improving bolometer compensation. One or more of the teachings herein can be applied to or combined with features, functions or structures used in other systems, including other bolometer circuits, such as those described in U.S. Pat. No. 6,028,309 to Parrish et al. and U.S. Pat. No. 5,756,999 to Parrish et al., both entitled "Methods and Circuitry For Correcting Temperature-Induced Errors In Microbolometer Focal Plan Array" and U.S. Pat. No. 6,812,465 to Parrish et al., entitled "Microbolometer Focal Plane Array Methods and Circuitry," all of which are hereby incorporated by reference in their entireties.

Referring first to FIG. 10, a bolometer circuit 10 is shown. Circuit 10 comprises a plurality of bolometer detectors, such as detector 12, coupled to a substrate 14. In this embodiment, detectors 12 may comprise at least two detectors, or an array (e.g., a focal plane array for a bolometer) arranged in a rectangle, square, circle or other shape, which may comprise less than or at least about 50 by 50 detectors, 160 by 120 detectors, 320 by 240 detectors, less than about 640 by 512 detectors, or any other number of detectors. In various embodiments, detectors 12 and other resistors may individually, by column or row, or in groups be electrically coupled or not electrically coupled to substrate 14, thermally coupled or not thermally coupled to substrate 14, disposed with a thermally isolating gap between detectors 12 and substrate 14 using isolating, electrically conductive legs or without a thermally isolating gap, have the same, different or substantially the same temperature coefficient of resistance (TCR) (preferably a high TCR so that heating and cooling significantly changes resistance) as others of detectors 12, and may be of any size, shape or material (e.g., comprising transducer material of vanadium oxide, amorphous silicon, etc.). Circuit 10 may comprise a microbolometer, which is an uncooled bolometer, or any other type of bolometer, including a bolometer temperature stabilized, heated or cooled by a thermoelectric cooler (TEC). Circuit 10 may comprise a microelectromechanical system (MEMS) structure.

Substrate 14 may comprise any material, such as a semiconductor material, such as silicon, gallium arsenide, etc. and may comprise complimentary metal oxide semiconductor (CMOS) structures. Substrate 14 may be coupled to a housing having a lens to allow in electromagnetic radiation, wherein the lens may focus the radiation onto the array of detectors 12. Thermally isolating gaps between detectors 12 and substrate 14 may be a vacuum or comprise a gas having a low thermal conductivity.

Circuit 10 comprises a processing circuit 11 which comprises various circuits configured to read out data from detectors 12. Processing circuit 11 comprises a bias circuit 16, a compensation circuit 20, a timing/multiplex circuit 26, one or more sources of calibration and bias data 28, an amplifier circuit 30, and a sample/hold circuit 32. These circuits are set forth as exemplary to illustrate various functionality. In alternative embodiments, processing circuit 11 may comprise any circuits elements, analog and/or digital components, an application-specific integrated circuit (ASIC), a microprocessor, a microcontroller, software, code, or other instructions which may be used to perform the functions and structures described herein. Components of the various circuits 16, 20, 26, 28, 30, and 32 may be combined, rearranged, and exchanged.

Bias circuit 16 is configured to provide a bias signal (e.g., current or voltage) across one or more of detectors 12 to allow them to be energized and have their resistance measured. The measured resistance will vary based on the amount of electromagnetic radiation received at a top surface of the detectors 12. In this exemplary embodiment, bias circuit 16 comprises a resistor Rbias 18, which may be a TCR-matched reference resistor which is thermally coupled to substrate 14. Bias resistor 18 may be TCR-matched to an individual detector 12, to a group of detectors 12, or to all of detectors 12. Resistor 18 may provide a temperature compensation matching bias to an active bolometer detector 12 and thereby cancel much of the substrate temperature change effects. Resistor 18 may be operable for one or more of detectors 12 (e.g., all of detectors, all detectors in a row or column or other group, etc.), or each of detectors 12 may have its own bias resistor 18. Bias circuit 16 may further provide a pulsed bias current to detectors 12, as will be described in greater detail with reference to FIG. 7 below.

Compensation circuit 20 is configured to generate a compensation signal, such as a time-varying compensation signal, for one or more of detectors 12. The time varying compensation signal may comprise a ramp function, a plurality of step functions, a curve, an exponential function, other waveforms or any other time-varying function. The time varying compensation signal may be provided to detectors 12 as a current, voltage or other signal, may be provided to a single detector 12 with each pulse or to a row or column or other group of detectors 12 with each pulse, or may be provided to an output terminal of detector 12 (e.g., which may be summed, which includes subtracted, with the detector output signal). The time varying compensation signal may be summed with the detector output signal from detector 12. Compensation circuit 20 may comprise a resistor R1 22 and/or a compensation resistor Rcomp 24, either or both of which may be TCR-matched reference resistors to detectors 14 thermally coupled to substrate 14. The functionality of resistor R1 22 and compensation resistor Rcomp 24 will be described in exemplary form at least with reference to FIGS. 3, 6 and 8 below.

Bias circuit 16 and compensation circuit 20 may be configured to generate the bias signal and compensation signal, respectively, based on bias data and calibration data received from source of calibration and bias data 28. Source 28 may comprise a memory of any type (e.g., digital, read-only memory, flash memory, on-chip or off-chip memory, discrete circuit components, a microprocessor or other processing circuit output, etc.) configured to store calibration data and bias data for each of detectors 12. According to one embodiment, source 28 comprises a look-up table or other database of calibration and bias data comprising a unique set of calibration and bias data (and optionally other data, such as gain data) for each of detectors 12, or groups of detectors 12, such as detectors having a common row, column, on an outside or inside portion of the array, detectors closer to a row of amplifiers, etc. The bias signal and compensation signal may be based on the bias data and calibration data, respectively, by amplifying (which includes attenuating), summing (which includes subtracting), or any other processing step. Bias circuit 14 and compensation circuit 20 may further comprise amplifying circuitry or other circuitry, as will be described in exemplary form hereinbelow.

Timing/multiplex circuit 26 is configured to control or coordinate the strobing, pulsing, or cycling of detectors 12 using any of a variety of different methods. For example, circuit 26 may control bias circuit 16 and/or compensation circuit 20 to pulse and/or compensate one row of detectors 12 at the same time while reading out detected signals from each column substantially simultaneously or sequentially. In this exemplary architecture, each column or group of columns has an associated amplifier circuit, such as amplifier circuit 30, bias circuit, such as bias circuit 16, a multiplying digital-to-analog circuit (MDAC) and other signal processing functions such as sample and hold (S/H), analog to digital (A/D) conversion, and multiplexing. Alternatively, circuit 26 may control bias circuit 16 and/or compensation circuit 20 to pulse and/or compensate one column of detectors 12 at the same time while reading out detected signals from each row substantially simultaneously or sequentially. All detectors in the array may be read at a frame rate, which may be greater than 1/30th of a second, fast enough to prevent visibly noticeable flicker or at another rate greater or less than $1/30^{th}$ of a second.

Amplifier circuit 30 may be configured to amplify detector signals received from detectors 12 and/or the sum of the detector signals with bias signals and compensation signals. Bias circuit 16 and compensation circuit 20 may also or alternatively comprise amplifying circuitry. Amplifier circuit 30 may be operable for one or more of detectors 12 (e.g., all of detectors, all detectors in a row, column, or other group, etc.), or each of detectors 12 may have its own amplifier.

Sample/hold circuit 32 receives the detector signals and holds them for a predetermined time period to allow detectors 12 to be read again while awaiting further processing of the detector signals by off-chip processing 34 for storage, display, or other use.

Off-chip processing 34 may comprise any analog and/or digital circuitry and/or software, code or other instructions (e.g., a dedicated digital signal processor (DSP), a desktop computer, laptop, handheld computer, etc.) configured to process the detector data. For example, an algorithmic non-uniformity correction technique, such as scene-based non-uniformity correction, a curve-fitting technique such as LaGrange curve fitting, any two-point correction (gain and offset) algorithm, etc. may be applied, which, when combined with various embodiments of temperature-stabilizing compensation described herein, may allow the bolometer focal plane to operate without controlling substrate temperature, alleviating the need for a Thermo-Electric Cooler (TEC). Off-chip processing 34 may be configured to change gain and/or offset with temperature, for example as shown and described with reference to FIG. 23 of U.S. Pat. No. 6,821,465. Scene Based Nonuniformity Correction algorithms may be implemented to provide continuous reduction and/or removal of spatial nonuniformities of gain and offset.

Referring now to FIG. 3, a bolometer circuit 10 is shown according to an exemplary embodiment. Circuit 10 comprises bias circuit 16, compensation circuit 20, bolometer detector circuit 38, and amplifier circuit 40 (e.g., an operational amplifier configured as a transimpedance amplifier). Bias circuit 16 comprises a voltage source Vbias 17 (which may alternatively be a current source or other power source) and bias resistor Rbias 18, creating a current Ibias 19 flowing from voltage source 17 to an inverting input 42 of amplifier circuit 40. Compensation circuit 20 comprises a voltage source Vcomp 21 (which may alternatively be a current source or other power source) and a compensation resistor Rcomp 24, creating a compensation current 25 flowing from voltage source 21 to inverting input 42 of amplifier 40. Detector circuit 38 comprises a voltage source 39 having a negative terminal thereof coupled through a switch 41 through detector 12, creating a current Idet 43 flowing from inverting input 42 of amplifier 40 toward voltage source 39. Switch 41 may be controlled by timing/multiplex circuit 26 to select detector 12 for a pulse bias to close at time ts(N), wherein N represents the detector 12 being read. Switch 41 may be closed during a sample period of a pulse. A noninverting input 46 of amplifier 40 is coupled to ground. A feedback resistor Rf 48 is coupled between an output Vout 50 of amplifier circuit 40 and inverting input 42, creating a current Isignal flowing from output 50 to inverting input 42. The potentials used in this circuit may be uniformly offset leaving the most negative source at ground potential for convenience in which case the output, Vout will be similarily offset.

The feedback amplifier circuit shown in FIG. 3 provides for a fixed voltage bolometer detector bias and current summation of detector (Idet 43), bias (Ibias 19), and bias heating (Icomp 25) compensation currents which cumulatively flow through feedback resistor Rf 48.

$$I_{signal} = I_{det} - I_{bias} - I_{comp} = V_{det}G_d(T) - V_{bias}G_{bias}(T_{sub}) - V_{comp}G_{comp}(T_{sub})$$

where $G_d(T)$=detector conductance at temperature T, $G_{bias}(T_{sub})$=bias resistor conductance at temperature $T_{sub}$ (substrate temperature), and $G_{comp}(T_{sub})$=compensation resistor conductance at temperature $T_{sub}$.

The output voltage of amplifier 40 can be computed by:

$$V_{out} = I_{signal}R_f(T_{sub})$$

where $R_f(T_{sub})$=feedback resistance at temperature $T_{sub}$.

Rf 48, Rbias 18, and Rcomp 20, if constructed using material with the same or substantially the same TCR as Rdet 14 and in close thermal contact to substrate 14, will approximately retain the same resistance ratio over temperature except for pulse bias heating effects of the thermally isolated bolometer detector. Therefore, the gain and bias conditions, except for the effects of bias heating of the detector, are relatively constant over temperature.

In one embodiment, Vdet 39 may be the same voltage provided across all or a group of detectors 12, wherein the current Idet changes based on the resistance of the detector. The bias voltage of detector Rdet 12 is fixed or constant and compensation is provided by changing a bias voltage on resistor Rcomp using a ramping voltage Vcomp 21 to create a time-varying compensation current Icomp 25.

Referring now to FIG. 4, a time varying signal or potential, Vcomp 21, which is used to compensate for detector bias heating, is generated such that its amplitude varies with temperature as the conductance of a resistor having the same TCR as the bolometer, as will be described in exemplary form with reference to FIG. 8. Vcomp 21 may be optimized for each detector, for example by using a source of calibration data 28 (e.g., a digital memory configured to store digital coefficients, constants, or other data, such as a unique or individual calibration data for each of detectors 12) and a multiplying digital to analog converter (MDAC) 54 (e.g., a 6- or 8-bit DAC, or less than a 16-bit DAC, or a DAC having any other number of bits), whose digital input multiplier is calibrated for compensation of the pulse heating over temperature range and applied during each detector bias period. MDAC 54 may be configured to amplify (which includes attenuating) the time varying signal 52 based on the calibration data from source 28. Other circuits or structures may be used to apply calibration data to detectors 12. According to one exemplary embodiment, one MDAC is provided to control each column or group of pixels, V'comp 52 may be provided "globally" to all MDACs while Vcomp is unique to each detector by changing MDAC values as the rows are selected sequentially.

Referring now to FIG. 5, a bias signal, Vbias 17 may be similarly optimized for each detector in combination with Vcomp 21, to remove non-uniformities in Rdet 14, Rbias 16, and other circuit elements by generating the voltage using a digital to analog converter (DAC) 56. Unique or individual calibration coefficients associated with each detector 12 and associated circuitry are applied to DAC 56 each bias period.

Figure 6:
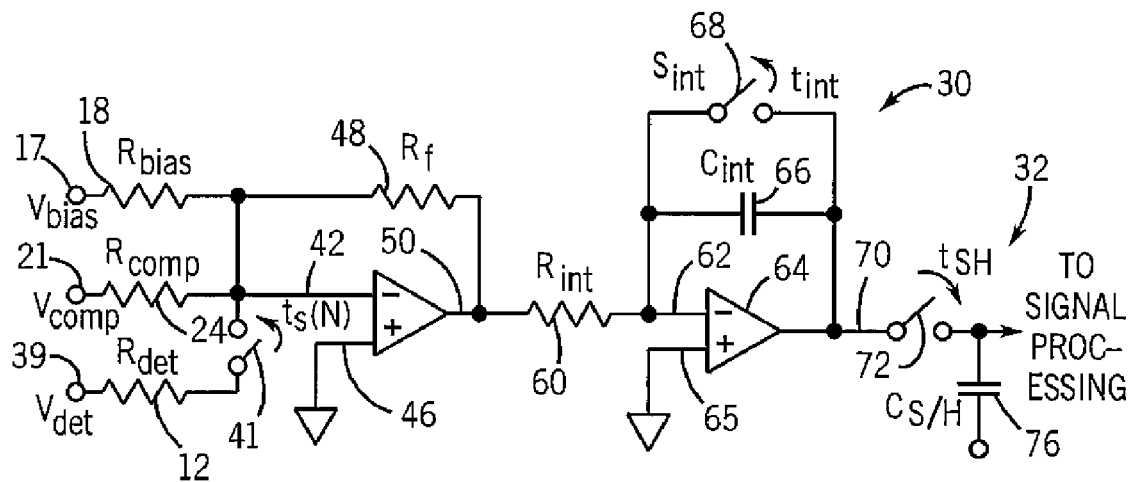
FIG. 6 is a schematic diagram of a bolometer circuit, according to an exemplary embodiment.

Referring now to FIG. 6, output 50 of amplifier 40 is provided to amplifier circuit 30, which comprises an integrator resistor Rint 60 coupling output 50 to an inverting input 62 of an operational amplifier 64. A noninverting input 65 of amplifier 64 is coupled to ground. A capacitor 66 and switch Sint 68 are coupled in parallel across inverting input 62 and an output 70 of operational amplifier 64. Switch Sint 68 is opened at time $t_{int}$ (at time $t_0$ in FIG. 7) as will be described in greater detail below. Output 70 is coupled to sample and hold circuit 32, which in exemplary form comprises a switch 72 configured to close sampling the output voltage 70 at time $t_{sh}$ and hold the voltage at the end of $t_{sh}$ upon opening on a capacitor $C_{s/h}$ 76. Alternatively, sample and hold circuit 32 may comprise one or more D flip-flops, memories, transistors, or other circuit elements.

Figure 7:
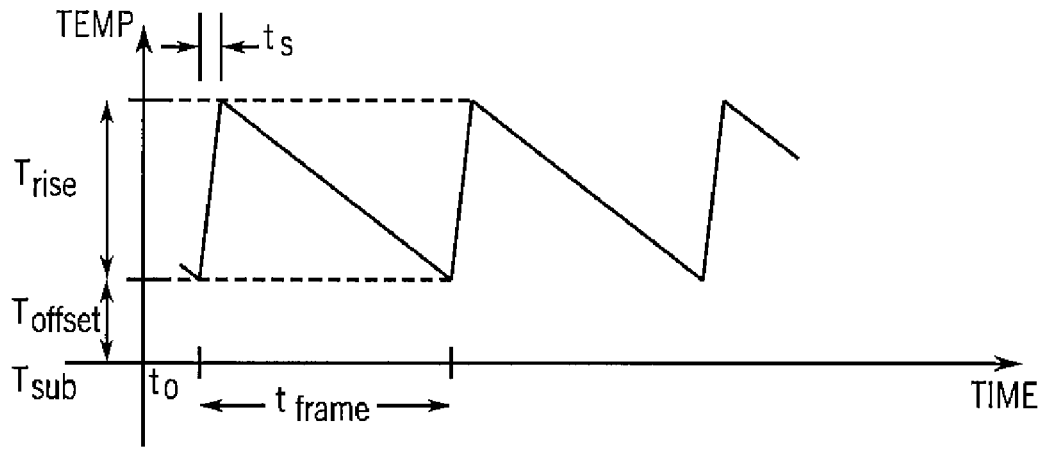
FIG. 7 is a chart illustrating a bias pulse heating effect, according to an exemplary embodiment.

In operation, output signal 50 is integrated over a bias period (represented by $t_s(N)$ in FIGS. 6 and 7) to band limit noise while sample and hold circuit 32 captures the integrated potential at the end of the period for further processing such as A/D conversion and multiplexing to the focal plane output (e.g., by off-chip processing 34 in FIG. 10).

Figure 13:
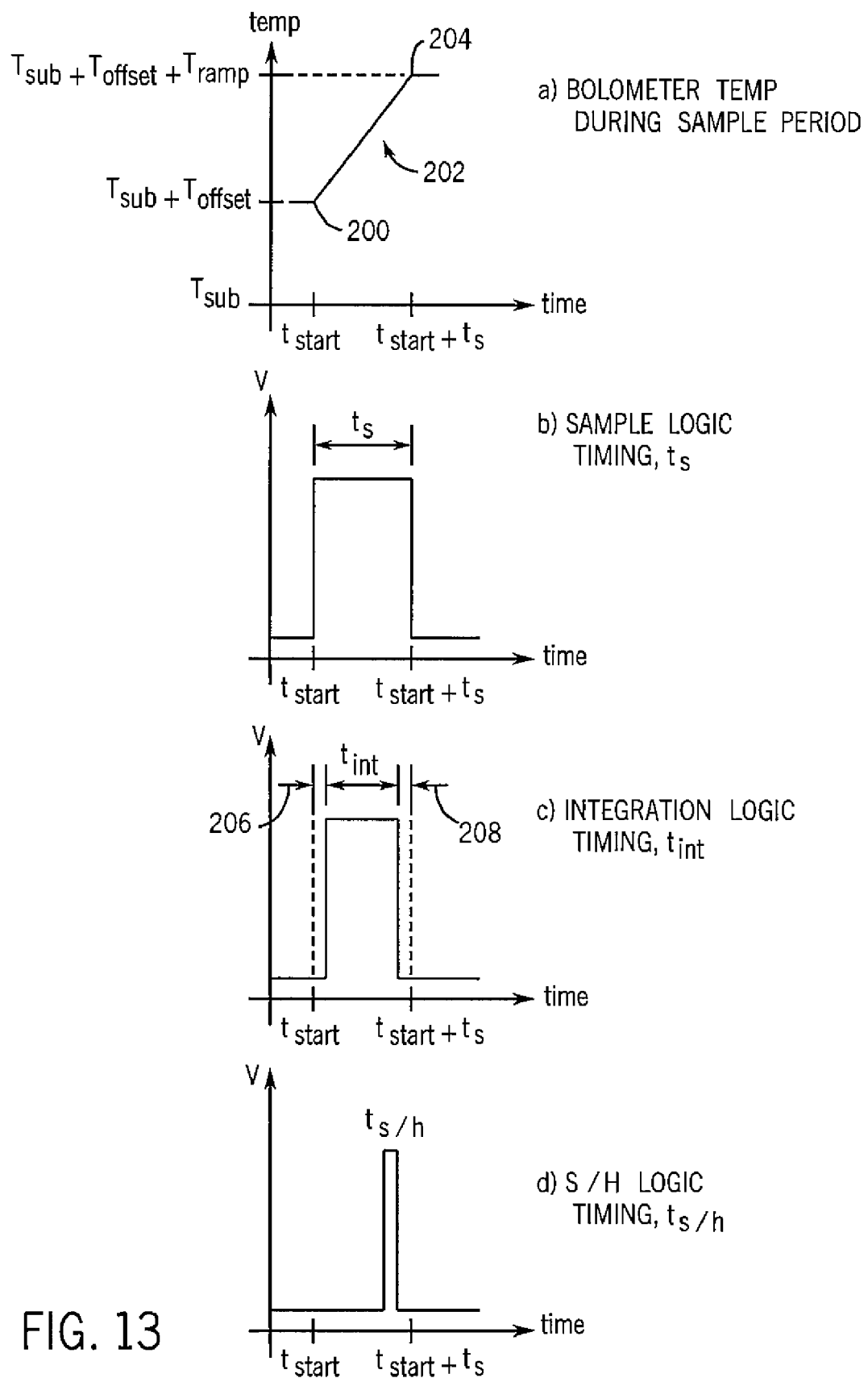
FIG. 13 is a chart illustrating logic timing, according to an exemplary embodiment.

Referring now to FIG. 13, a series of charts illustrates logic timing according to an exemplary embodiment. FIG. 13a illustrates bolometer temperature during a sample period $t_s$. At time $t_{start}$, bolometer temperature is the substrate temperature ($T_{sub}$) plus an offset temperature ($T_{offset}$) at point 200 over the duration of the pulse bias period $t_s$. Bolometer temperature rises as shown at ramp 202 until a point 204 at which the pulse bias is removed, leaving the bolometer temperature at $T_{sub}$ plus $T_{offset}$ plus a ramp temperature $T_{ramp}$.

As shown in FIG. 13b, a pulse bias if provided (e.g., from timing/multiplex circuit 26 in FIG. 10 or other control circuit) for a period from $t_{start}$ to $t_{start}$ plus $t_s$ and may be provided with a fixed bias voltage. As shown in FIG. 13c, timing/multiplex circuit 26 may be configured to enable integration for a period of time $t_{int}$ by opening switch 68 (FIG. 6) at the beginning of $t_{int}$ and closing switch 68 at the end of time $t_{int}$. A delay 206 is provided by circuit 26 between $t_{start}$ and the beginning of $t_{int}$. Also, a delay 208 is provided between the end of $t_{int}$ and the end of time $t_s$. As shown in FIG. 13d, circuit 26 is configured to provide a signal to close switch 72 at time $t_{S/H}$ to provide a sample and hold logic timing. As illustrated, switch 72 is closed for a short period of time and then reopened prior to the end of $t_{int}$ in FIG. 13c.

The conductance of a bolometer and a resistor constructed from the same high TCR material can be modeled as:

$$G_D(T) = G_D(T_0)\exp\left(\alpha T_0^2\left(\frac{1}{T_0} - \frac{1}{T}\right)\right)$$

where $\alpha$ is the temperature coefficient of resistance at a nominal reference temperature, $T_0$ (typically room temperature).

The temperature of the bolometer is increased due to pulse bias heating as depicted in FIG. 7 for tframe>>ts. The temperature ramps up each time the detector is biased and during its "off" time, tframe−ts, the temperature decays toward the substrate temperature to Toffset with a time constant equal to Thmass/Thconductivity.

$$T_{rise} \cong \frac{P_D t_s}{Th_{mass}}$$

where $P_D$=electrical power dissipation during $t_s$, $t_s$=the pulse bias period, and $Th_{mass}$=detector thermal mass and Thconductivity=the detector thermal conductance to the substrate.

In an exemplary embodiment, tframe may be about 33 millisconds, or more than about 10 milliseconds and less than about 200 milliseconds. ts may be about 50 microseconds, or more than about 10 microseconds and less than about 200 microseconds. Tsub may be between about −40 degrees C. and about 85 degrees C. Toffset may be between about 0.1 degrees C. and about 10 degrees C. Trise may be between about 0.1 degrees C. and about 10 degrees C. The ratio of Toffset/Trise may be between about 0.1 and about 10.

The offset temperature, Toffset, in steady state operation can be calculated to be $$T_{offset} \cong T_{rise}\frac{e^{-t_{frame}/\tau}}{1 - e^{-t_{frame}/\tau}}$$

where $t_{frame}$ is the pulse repetition period or frame time and $\pi$ is the bolometer thermal time constant, and Toffset is therefore a constant ratio of Trise determined by the frame time and the detector time constant.

The resultant current through the feedback resistor Rf can be calculated by:

$$I_{sig} \approx V_{det}[G_D(T_{sub}) + \Delta G_D(T_{offset} + T_{rise}) + \Delta G_D(\Delta T_{op})] - V_{bias}G_{bias}(T_{sub}) - V_{comp}(T_{sub})G_{ramp}(T_{sub})$$

where $\Delta G_D(\Delta T)$ is the change in conductance due to heating and $\Delta T_{op}$ is the change in temperature due to optical heating. By separating the detector conductance into the temperature conductance due to ambient substrate temperature before pulse bias heating and the increase in conductance due to pulse bias heating along with the optically generated change in conductance, the compensation current required to cancel the heating effects can be approximated:

$$I_{comp} = V_{comp}(T_{sub})G_{ramp}(T_{sub}) = V_{det}\Delta G_D(T_{offset} + T_{rise})$$

and $$I_{bias} = V_{det}G_D(T_{sub}) = V_{bias}G_{bias}(T_{sub})$$

where the change in conductance can be approximated by:

$$\Delta G_D \approx G_{det}(T_{sub})(\alpha \Delta T)$$

where $\Delta T$ is the increase in temperature above $T_{sub}$ due to pulse bias heating.

By matching the increase in detector current with a compensating current the resultant current, less optical signal induced current, will be nearly cancelled over a wide range of temperature.

$$I_{sig} \cong V_{det}\Delta G_D(\Delta T_{op})$$

Figure 8:
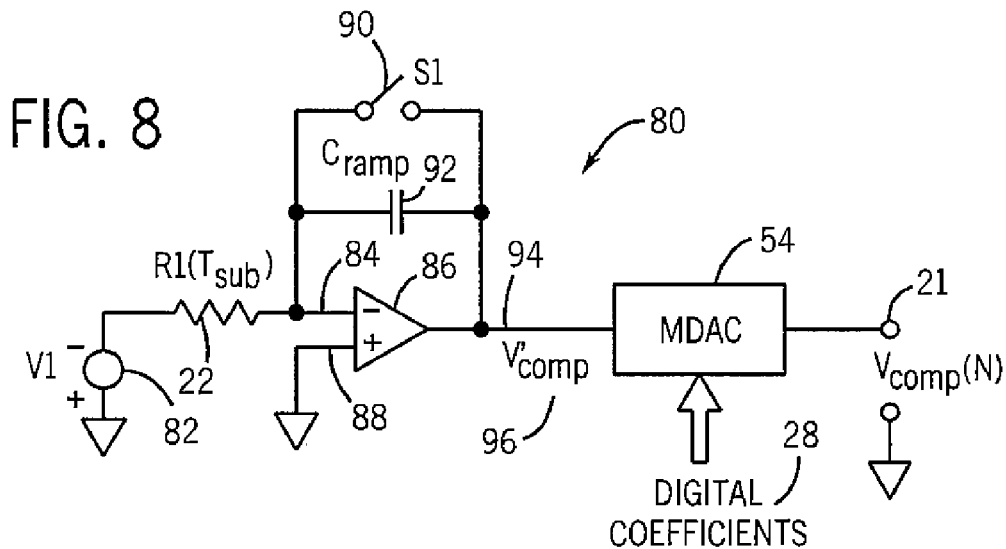
FIG. 8 is a schematic diagram of a compensation circuit, according to an exemplary embodiment.

Referring now to FIG. 8, an exemplary compensation waveform generation circuit 80 (which may be a portion of compensation circuit 20) will be described. Circuit 80 comprises a voltage source V1 82 having a negative terminal thereof coupled through resistor R1(Tsub) 22 to an inverting input 84 of an operational amplifier 86. Non-inverting input 88 of op-amp 86 is coupled to ground. A switch S190 and capacitor Cramp 92 are coupled in parallel across an output 94 of operational amplifier 86 and inverting input 84. A global time-varying signal V'comp 96 is created as an output signal of amplifier 86, which is then amplified for the particular detector to be read by, for example, MDAC(N) 54 and source 28 to create Vcomp(N).

In operation, circuit 80 generates a ramp potential using an integrator (op amp 86 and Cramp 92) to provide a linearly increasing ramp voltage with time having a slope of V1/(R1(Tsub)*Cramp). The slope and therefore magnitude of the ramp increases with substrate temperature as 1/R1(Tsub). Alternatively, other circuits may be used to create time-varying signals other than a ramp.

Circuit 80 may be configured to pre-start the ramp potential a predetermined time before the bias pulse, for example to allow building up an offset voltage. The predetermined time may be any time period, for example a time period depending on the ratio of a temperature of the bolometer detector above the substrate temperature at the beginning of the pulse (Toffset) to a temperature rise of the bolometer detector at the end of the pulse (Trise). For example, the predetermined pre-start time may be between about 0.1 microseconds and about 100 microseconds seconds. By pre-starting the ramp by releasing the switch S190 a fixed time before the beginning of the detector bias period, an offset proportional to the magnitude of the ramping voltage can be generated. The pre-ramp integration time may be set equal to the ratio of Toffset/Trise or $$T_{start} = t_s \frac{e^{-t_{frame}/t_s}}{1 - e^{t_{frame}/t_s}}$$

As shown in FIG. 9, a time-varying signal (e.g., an offset voltage) may be generated by circuit 80 or another circuit which proportionally matches the increase in Vramp over temperature. Three curves are shown in FIG. 9 for Tsub-low=0, Tsub-med=25, and Tsub-high=60 degrees C. As temperature rises, the slope of the ramp increases proportionally to 1/R1 increasing both the compensating starting potential, Voffset and the compensating ramp potential, Vramp.

A compensation current, Icomp, is generated by applying the MDAC coefficient calibrated compensation voltage to Rcomp which has substantially the same TCR as the detector. The resulting compensation current is calibrated to track the temperature dependent pulse bias heating increase in detector current over a wide temperature range. The offset potential of the calibrated waveform tracks the increase in conductance of the detector due to Toffset while the ramping portion of the waveform, Vramp, tracks the conductance decrease during the pulse bias period.

A calibrated compensation signal is provided for both the static and dynamic effects of pulse bias heating and bolometer array non-uniformities. The compensation is implemented on a detector by detector basis using stored digital coefficients to create analog signals which are added to the amplified detector signals along the focal plane array signal processing sequence.

As mentioned, different bolometer detectors 12 in an array may have different resistances due to variances, which could be as great as +/−10%. Accordingly, calibration data is generated for each of detectors 12 for use with compensation circuit 20. Calibration data may be generated during manufacturing of each bolometer array, as the last step in the manufacturing process. For each detector, one or more data points, or more specifically between five and hundreds of data points may be taken, depending on the algorithm used. The compensation signal magnitude may be unique to each detector (controlled by the digital input to MDAC) whereas the ramp basic shape and offset to ramp ratio may be fixed for the entire array. Calibration data may be collected at two or more different temperatures to determine the slope that the ramp of FIG. 9 should be for each one of the detectors.

An exemplary procedure is now described for determining the compensation data coefficients to best compensate for non-uniformities of bolometers 12 in an array and their respective pulse bias heating effects to provide a uniform and temperature stable output.

The appropriate bias current for each bolometer 12 can be determined by adjusting Vbias DAC 56 such that the initial integration slope of Vint (at output 70 of FIG. 6) for each detector is closest to zero. Vint is sampled near the beginning, approximately 20%, of the pulse bias period, ts, in order that the effects of pulse bias heating are reduced. This calibration may be achieved when the array is operated at a low temperature, room temperature or below, such that the pulse bias heating effects are minimized, which minimizes the required magnitude of the compensation ramp, Vcomp. The coefficient search algorithm, operable on a calibration controller and/or as part of processing circuit 11 (FIG. 10) may be conducted using a simple incrementally increasing DAC coefficient to find the best fit or a binary successive approximation search, such as used in a successive approximation analog to digital converter, ADC.

The magnitude of the compensation waveform may be determined by operating at elevated temperature, near or at the maximum operating temperature, where the effects of pulse bias heating are greatest. Vint is sampled at both ts and, in a separate measurement, ts/2. Thereby the effects of pulse bias heating may be analyzed and compensated for. Again, a search algorithm to determine the best fit for the MDAC compensation waveform gain as well as tstart is applied and similarly an incrementally increasing (or decreasing) MDAC coefficient or successive approximation algorithm search can be used.

Using superposition, the integrated response to the compensation current generated from Vcomp can be calculated as:

$$V_{int}(t) = \left(\frac{Rf}{R_{comp}R_{int}C_{int}}\right)\left(\frac{Voffset}{2t_{start}}\right)\left((t + t_{start})^2 - t_{start}^2\right)$$

Figure 14:
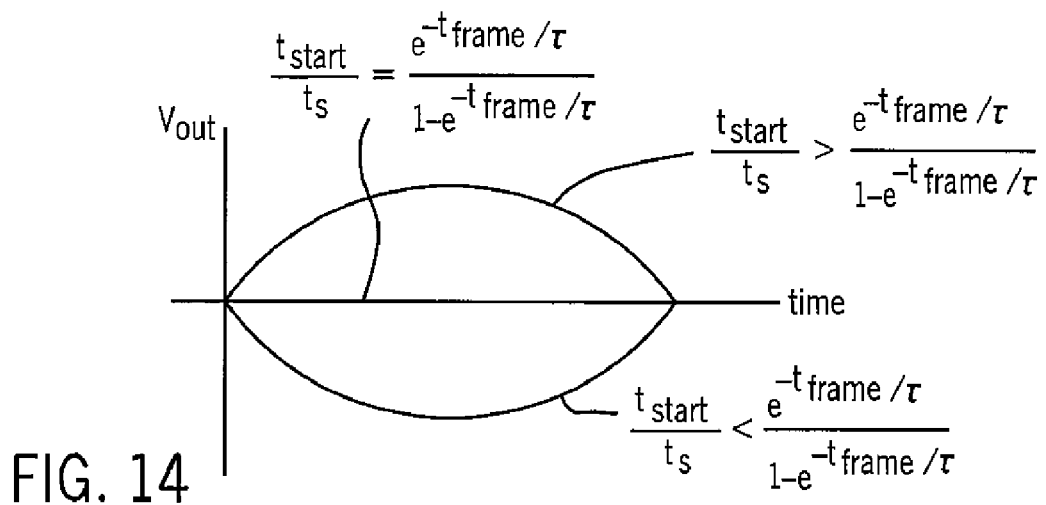
FIG. 14 is a chart illustrating response due to setting the ratio of $t_{start}$ to $t_s$ long or short.

MDAC 54 can be adjusted such that the integrated current is equal to the additional current from the bolometer due to pulse bias heating at ts; however the instantaneous value of the integration during the integration period may not match that of the bolometer unless the ratio of tstart to ts is properly applied. This response can be seen in FIG. 14. When tstart is too long, the waveform has a positive parabolic shape indicating that the compensation current is initially larger than the pulse bias heating generated detector current. When the ratio is too short, a negative parabolic shape is generated. By sampling the waveform halfway through the integration period at tstart+ts/2 in addition to tstart+ts, the shape of the waveform can be determined and thereby the appropriate ratio of tstart to ts can be applied.

According to one advantageous embodiment, an iterative calibration procedure may be used. However, in production, the initial starting value of the pulse bias heating waveform and ramp magnitude can be statistically determined and tracked over the volume of test and calibration and thereby eliminate the need for an iterative procedure. In general, the thermal mass and thermal conductivity of a particular design and process is relatively stable and therefore the appropriate ramp and offset to ramp ratio do not vary greatly, so that an initial starting point of the statistical average of previously determined compensation coefficients will aid greatly to the convergence in calibration.

Figure 11:
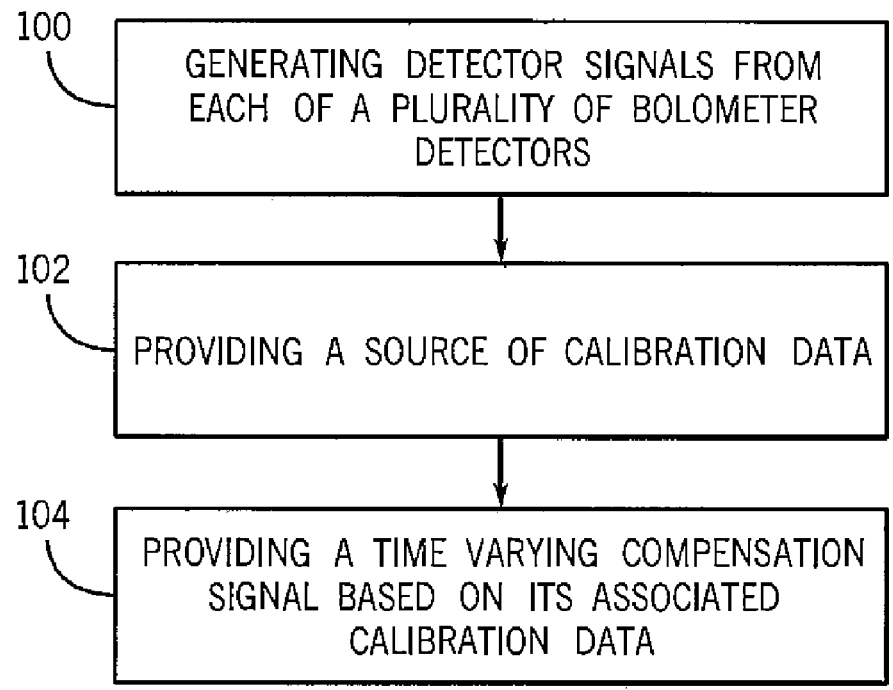
FIG. 11 is a flow chart of a method of bolometer compensation, according to an exemplary embodiment.

Referring now to FIG. 11, a flowchart illustrating a method of compensation is shown according to an exemplary embodiment. At step 100, the method comprises generating detector signals from each of a plurality of bolometer detectors. At step 102, the method comprises providing a source of calibration data. At step 104, the method comprises providing a time-varying compensation signal based on calibration data associated with the bolometer detector being read. The steps may be rearranged in order and may be supplemented at various points with other steps described hereinabove with reference to other embodiments as well as iterated to find the best compensation coefficients.

Figure 12:
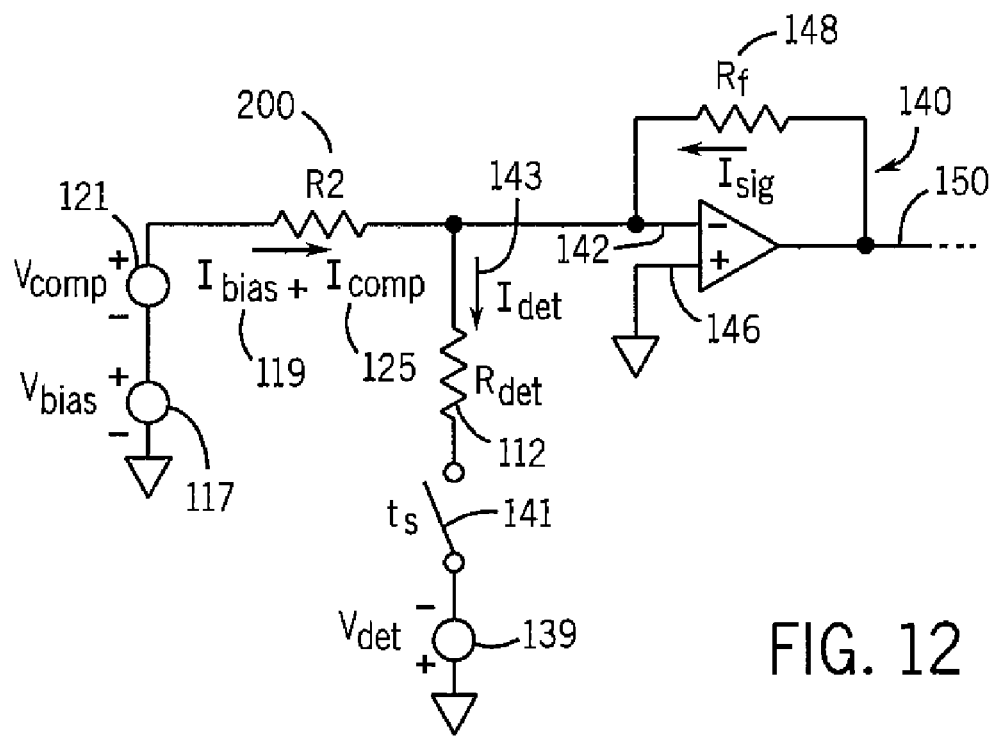
FIG. 12 is a schematic diagram of a bolometer circuit, according to an alternative embodiment.

Referring now to FIG. 12, a bolometer circuit is shown according to an alternative embodiment. In this embodiment, compensation circuit 121 and bias circuit 117, illustrated as voltage sources in series, are combined into a circuit wherein bias and compensation currents 119 and 125 flow through a resistor 200 (R2). Resistor 200 may provide the function of Rbias 18 and Rcomp 20 in the embodiment of FIG. 3. Resistor 200 may be a single resistor in the embodiment. Other elements of FIG. 12 may operate similarly to corresponding elements in FIG. 3.

Figure 15:
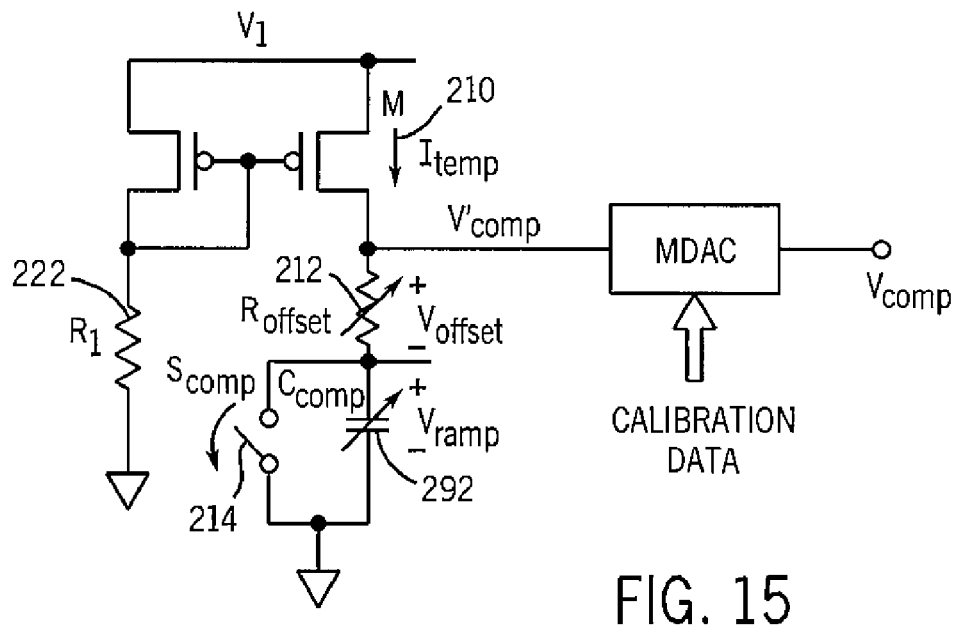
FIG. 15 is a schematic diagram of a compensation circuit, according to an exemplary embodiment.
Figure 16:
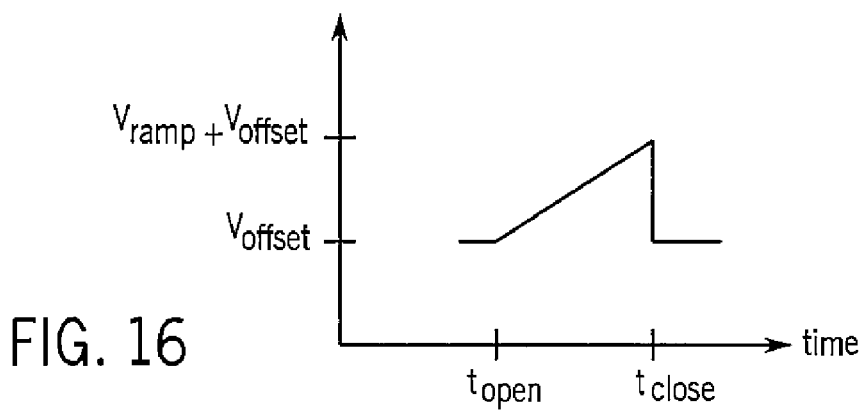
FIG. 16 is a chart showing a waveform produced by the circuit of FIG. 15, according to an exemplary embodiment.
Figure 17:
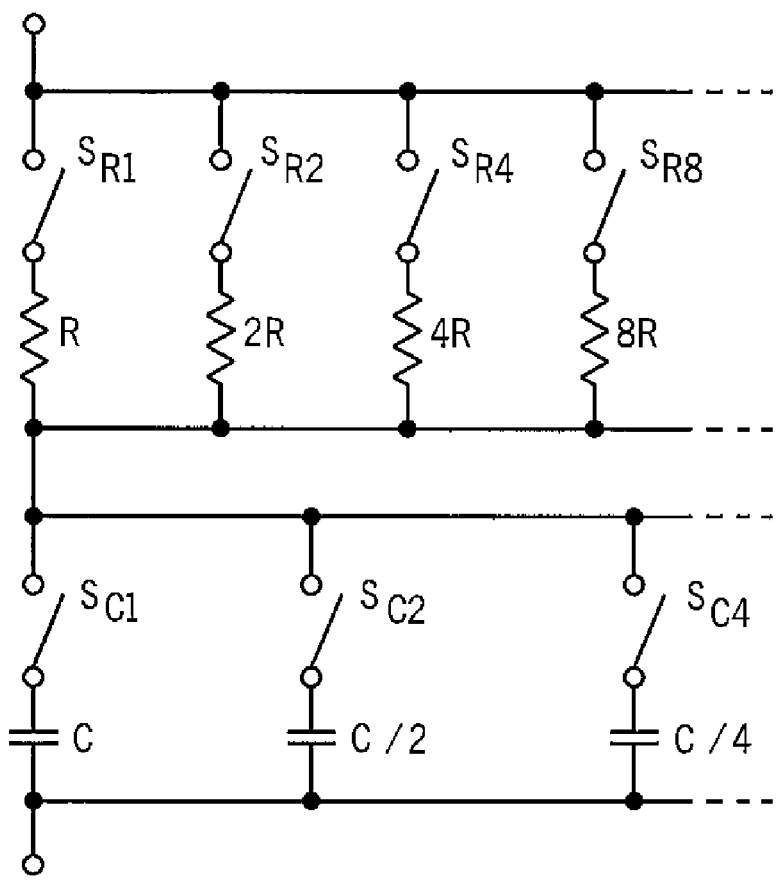
FIG. 17 is a schematic diagram of a binary switched resistor and/or capacitor network, according to an exemplary embodiment.

Referring now to FIGS. 15-18, an alternative compensation waveform generation circuit will be described. An alternate method of generating a global compensation waveform incorporating Vstart and Vramp can be achieved by passing a temperature compensated current, Itemp 210, through the series combination of Ccomp 292 and Roffset 212 as shown in FIG. 15. Itemp is generated by applying a voltage potential across a TCR matched resistor, R1. This current may be pre-scaled by the use of a current mirror multiplier with digitally selectable multiplier coefficients or other such equivalent scaling circuitry. As the scaled current, Itemp, flows through Roffset 212, it generates a potential Voffset proportional to the temperature adjusted current, Itemp. Additionally, when the switch Scomp 214 is opened at the beginning of the integration period $t_{int}$, an increasing ramp voltage is generated across Ccomp equal to Itemp*t/Ccomp. The resulting overall waveform is shown in FIG. 16. The ratio of Voffset to Vramp may be adjusted by making Roffset 212 and/or Ccomp 292 digitally adjustable using a binary switched resistor and/or capacitor network as shown in FIG. 17, wherein each of a plurality of resistors and capacitors of increasing or decreasing magnitude (e.g., R, 2R, 4R, 8R etc. and C, C/2, C/4, etc.) is independently switchable into the circuit by digital selection (e.g., from circuit 26). The amplitude of the output of the compensation waveform is modulated by multiplying DAC(s), MDAC(N) to provide a calibrated compensation waveform for each individual detector signal as it is being amplified.

Figure 18:
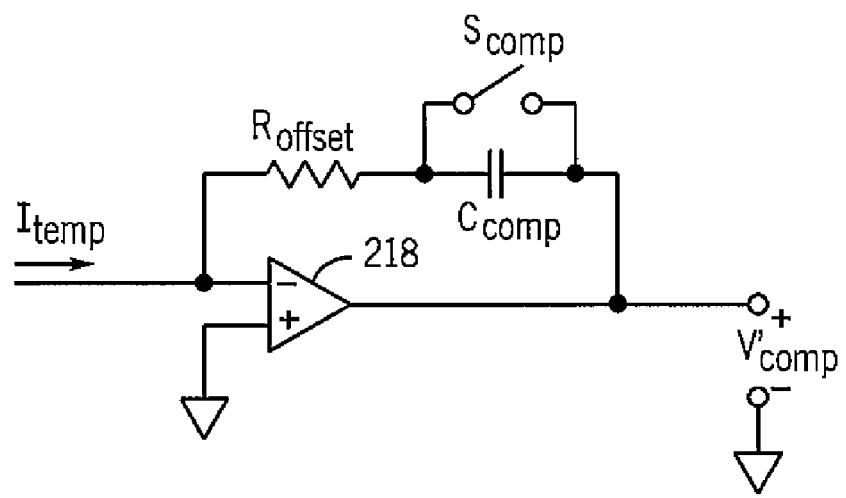
FIG. 18 is a schematic diagram of a feedback amplifier circuit, according to an exemplary embodiment.

The Roffset and Ccomp network may also be placed in the feedback of a high gain or operational amplifier 218 as shown in FIG. 18. Itemp flows through the feedback network generating a potential of $$V\text{comp}=-I\text{temp}*(R\text{offset}+t/C\text{comp}).$$

While the exemplary embodiments illustrated in the FIGS., and described above are presently exemplary, it should be understood that these embodiments are offered by way of example only. For example, the teachings may by applied to various types of sensors of any type of electromagnetic radiation. Accordingly, the present invention is not limited to a particular embodiment, but extends to various modifications that nevertheless fall within the scope of the appended claims.

What is claimed is:

1. A bolometer circuit, comprising:
a substrate;
a plurality of bolometer detectors coupled to the substrate;
a source of calibration data, each bolometer detector having an associated calibration data; and
a compensation circuit configured to generate a time varying temperature compensation signal based on substrate temperature for each bolometer detector based on its associated calibration data, such that a bolometer detector signal is temperature compensated by the compensation signal over a range of substrate operating temperatures, wherein the source of calibration data comprises a digital memory and the compensation circuit comprises a multiplying digital to analog converter configured to attenuate or amplify the time varying temperature compensation signal based on the calibration data, wherein the time varying temperature compensation signal comprises a ramp potential.

2. The bolometer circuit of claim 1, wherein the bolometer detector signal is summed with the time varying temperature compensation signal.

3. The bolometer circuit of claim 1, further comprising:
a source of bias data, each bolometer detector having an associated bias constant; and
a bias circuit configured to pulse bias each bolometer detector based on its associated bias constant.

4. The bolometer circuit of claim 3, wherein the bias circuit comprises a bias resistor thermally coupled to the substrate and comprising a material with substantially the same temperature coefficient of resistance as the bolometer detectors.

5. The bolometer circuit of claim 1, wherein the compensation circuit comprises a compensation resistor thermally coupled to the substrate and comprising a material with substantially the same temperature coefficient of resistance as the bolometer detectors.

6. The bolometer circuit of claim 1, wherein the compensation circuit comprises a resistor thermally coupled to the substrate and an integrator.

7. The bolometer circuit of claim 1, further comprising:
a bias circuit configured to pulse bias each bolometer detector, wherein the compensation circuit is configured to pre-start the ramp potential a predetermined time before the pulse bias.

8. The bolometer circuit of claim 7, wherein the predetermined time is proportional to the ratio of a temperature above substrate of the bolometer detector at the beginning of the pulse to a temperature rise of the bolometer detector during the pulse.

9. The bolometer circuit of claim 1, further comprising:
a bias circuit configured to bias each bolometer detector; and
an amplifier configured to receive a sum of a signal from the bolometer detector, the time varying temperature compensation signal, and a bias signal from the bias circuit.

10. The bolometer circuit of claim 9, further comprising an integrating amplifier to integrate and band limit the amplified and compensated detector signal.

11. The bolometer circuit of claim 10, further comprising a sample and hold circuit configured to sample and hold an output of the integrating amplifier.

12. The bolometer circuit of claim 1, wherein the plurality of bolometer detectors are arranged in an array of at least 50 by 50.

13. A method of compensating a bolometer signal, comprising:
generating detector signals from each of a plurality of bolometers;
providing a source of calibration data, each bolometer detector having an associated calibration data; and
providing a time varying temperature compensation signal to the detector signal from each bolometer based on its associated calibration data and based on substrate temperature, such that the detector signals are temperature compensated by the compensation signals over a range of substrate operating temperatures, wherein the calibration data is applied to a multiplying digital to analog converter to amplify or attenuate the time varying temperature compensation signal based on the calibration data, wherein the time varying temperature compensation signal comprises a ramp potential.

14. The method of claim 13, further comprising:
providing a bias circuit configured to pulse bias each bolometer; and
amplifying a sum of the pulse bias signal, time varying temperature compensation signal, and detector signal.

15. A system for compensating a bolometer signal, comprising:
means for generating detector signals from each of a plurality of bolometers;
means for providing a source of calibration data, each bolometer detector having an associated calibration data; and
means for providing a time varying temperature compensation signal to the detector signal from each bolometer based on its associated calibration data and based on substrate temperature, such that the detector signals are temperature compensated by the compensation signals over a range of substrate operating temperatures, wherein the calibration data is applied to a multiplying digital to analog converter to amplify or attenuate the time varying temperature compensation signal based on the calibration data, wherein the time varying temperature compensation signal comprises a ramp potential.

16. The system of claim 15, further comprising:
means for providing a bias circuit configured to pulse bias each bolometer; and
means for amplifying a sum of the pulse bias signal, time varying temperature compensation signal, and detector signal.

* * * * *